May 9, 1939. A. C. REID ET AL 2,157,435
SYNCHRONOUS MOTOR
Filed April 12, 1937
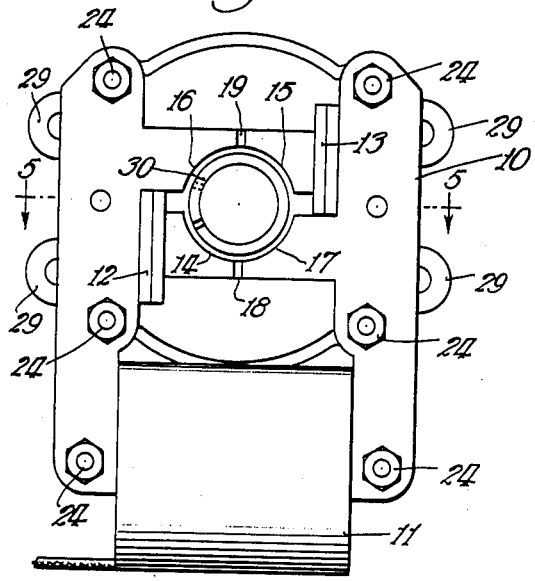
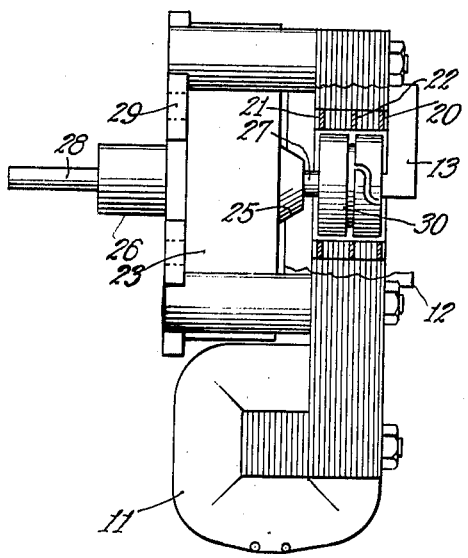
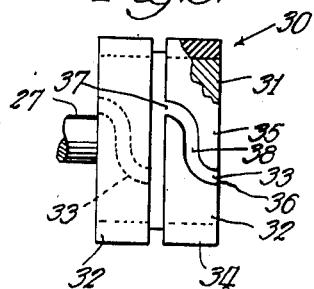
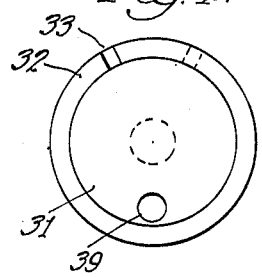
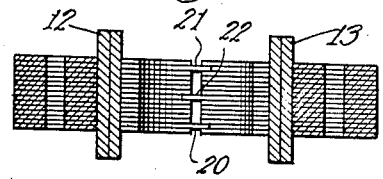
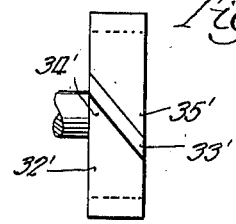
Inventors:
Alexander C. Reid
Harold J. McCreary
By Zabel Carlson & Wells Attys.

Patented May 9, 1939

2,157,435

UNITED STATES PATENT OFFICE 2,157,435

SYNCHRONOUS MOTOR

Alexander C. Reid and Harold J. McCreary, Genoa, Ill., assignors to Leich Electric Co., Genoa, Ill., a corporation of Illinois Application April 12, 1937, Serial No. 136,388

10 Claims. (Cl. 172—278)

The present invention relates to self-starting synchronous motors of the general type in which a rotor of magnetic material is caused to rotate by the influence of a rotating magnetic field.

The motors such as described above use a field magnet excited by a winding from a source of alternating current. The field winding has a plurality of polar projections providing circumferentially spaced poles partially shaded by utilizing shading coils on certain of the polar projections to create a rotating magnetic field. This type of field when used with a rotor element of magnetic material of ring form which is broken transversely to provide a gap in its circumference, has the disadvantage that the rotor tends to become locked stationary at those positions of the rotor where the space between the polar projections is aligned with the gap in the rotor. Heretofore this tendency has been overcome by modifying the field structure in such a fashion as to produce an overlapping field zone at the space between the opposite poles.

The present invention contemplates the provision of a rotor structure wherein this tendency to remain in a definite position is further overcome and the starting of the rotor is accomplished in a more efficient manner. This rotor construction enables the motor to be started with a lower voltage on the exciting winding and furthermore makes it possible to bring the motor up to synchronism and develop more power at synchronous speed.

The present invention contemplates also certain structural improvements in the rotor by which it is possible to utilize magnetic material for the rotor having a high retentivity in an economical and simple manner.

The rotor of the motor of the present application preferably consists of one or more bands of permanent magnet steel slotted to provide overlapping terminal portions on opposite sides of the slots, the bands being mounted upon the motor shaft, the entire rotor structure being balanced by means of the slots and wherever necessary by means of modifying the core structure of the rotor.

The novel features of this invention will be pointed out more particularly in the appended claims while the invention itself and the manner of operation will be understood more fully from the following description, reference being had to the accompanying drawing wherein a preferred form of the invention is shown.

In the drawing:

Figure 1 is a front view of a motor embodying the invention.

Figure 2 is a side view partly in section of the motor.

Figure 3 is an enlarged plan view partly in section of the rotor employed.

Figure 4 is an end view of a rotor.

Figure 5 is a sectional view taken on the line 5—5 of Figure 1 and

Figure 6 is a plan view of a modified form of the rotor.

Referring now to the drawing there is shown a motor of the self-starting synchronous type in which a bipolar field magnet 10 is provided with an exciting coil 11 and with shading coils 12 and 13 for causing a time lag of magnetic intensity in pole faces 14 and 15 behind that in pole faces 16 and 17. The pole faces 14 and 16 are separated from the pole faces 17 and 15 respectively by short gaps 18 and 19 between the laminations of the field magnet. The gaps 18 and 19 may desirably be bridged by extending certain laminations 20, 21 and 22 so that they are interleaved with the laminations of the opposite polar projections.

The field laminations are held together and to a housing 23 by a plurality of bolts 24. The housing 23 desirably contains a gear reduction unit not shown, and provides bearings 25 and 26 for a rotor shaft 27 and a driven shaft 28 respectively. Mounting ears 29 are provided on the housing 23. These ears are apertured so that the motor and housing can be mounted upon a supporting structure by means of screws, bolts, rivets, or the like.

The shaft 27 supports a rotor 30 between the pole faces 14, 15, 16 and 17.

The rotor 30 comprises a core 31 of non-magnetic material on the shaft 27 and one or more bands 32 made of a material having a high magnetic retentivity. Where more than one band 32 is used, the bands are spaced axially along the core 31. The core 31 may be made of any suitable non-magnetic material. Aluminum has been found to be quite satisfactory.

Rings of permanent magnet steel have been used heretofore in rotors of this character. However, when highest retentivity of the metal is obtained difficulty has been encountered in preventing locking in of the rotor. We have found that highest retentivity is of value in obtaining high torque for the motor and for this reason we employ a rotor in which the bands 32 have the highest magnetic retentivity we are able to obtain. For example, we have found that bands cut from tungsten steel and properly heat treated will give us excellent retentivity. The bands are heated to a temperature of 1425 degrees F. to 1450 degrees F. and quenched to harden them.

We have found that the rotor with the highest retentivity also has the highest synchronous torque, and that a discontinuity or variation in the area of cross section around the periphery of the band would greatly aid in creating a definitely fixed magnetic pole with respect to the rotor and thereby greatly help in maintaining absolute synchronism. However, it was found that the mere discontinuity also created a sharp tuft of magnetic flux which tended to lock the rotor and make starting difficult. This starting difficulty is eliminated in the present design of rotor in a simple and efficient manner.

Each band 32 is provided with a slot 33 which is so arranged that portions 34 and 35 of the band on opposite sides of the slot 33 overlap circumferentially of the band. The slot 33 is somewhat S shaped terminating at the side edges of the band in portions 36 and 37 which are substantially at right angles to the plane of the band. Intermediate the ends of the slot a portion 38 extends parallel to the side edges of the band, or in other words, circumferentially of the band for a substantial distance. This makes the portions 34 and 35 of the band of substantial cross sections throughout their length and is highly desirable in obtaining good starting torque at low voltage.

The slot 33 may also be arranged as shown at 33' in Figure 6, that is as a simple diagonally running slot which leaves the portions 34' and 35' of the rotor 32' overlapping for an appreciable extent of the circumference of the band.

By utilizing a flat band the effective gap between the rotor and field is reduced to minimum without decreasing the mechanical clearance. By a flat band we mean a band that has a cylindrical outer surface and which is much wider than it is thick. This shape of band enables us to concentrate the metal of the rotor close to the cylindrical outer surface thereof, which is not possible with a rotor which is of considerable depth radially of the rotor. This shape of band also increases effective armature surface without decreasing the effective clearance.

The present design also makes possible a better rotor balance. For example, if a single band 32 is provided the rotor may be reduced by means of a recess or opening 39 in the core diametrically opposite the slot 33 to balance the loss of material in the slot 33. Where a pair of bands 32 are used the slots 33 are arranged diametrically opposite each other. Even in this case they may be balanced by modifying the core. By using the present design of rotor, we are able to use tungsten magnet steel in sheet form which is not available in the form of wire so that a rotor of better magnetic characteristics is obtained. It is, of course, possible to vary the shape of the slots 33 and still obtain the overlapping portions 34 and 35 in various forms. The form shown in Figure 3, however, has proved exceptionally good and is to be preferred over that shown in Figure 6, for example, because of the better operating characteristics and because it is more practical from a manufacturing standpoint.

The peripheral length of the slots 33 in the bands 32 bears a definite relationship to the distribution of flux in the rotating field. There should not be an excessive overlapping by the portions 34 and 35. The overlapping is more effective if it is greater than the gaps in the field magnet.

The interleaving of the field laminations, of course, operates in the well known manner to aid in starting the rotor. It also helps to lock the parts together and prevent vibration in the field structure.

The present rotor structure provides for a rotor surface that is substantially continuous with respect to the flux from the field poles faces, but which is discontinuous circumferentially to the residual flux in the rotor. In other words, the rotor, in so far as its position with respect to the flux coming from the field poles, is substantially continuous because it is impossible to find a place circumferentially of the rotor where it is completely cut out. It is, of course, restricted in cross section where the slot is formed due to the fact that some of the material is taken out to form the slot. When the rotor is considered alone, the break caused by the slot obviously breaks the rotor magnetic circuit and sets up north and south poles on opposite sides of the slot.

From the above description, it is believed that the features of advantage of the present invention will be readily apparent to those skilled in this art. It is also believed to be obvious that various minor modifications may be made without departing from the scope of the invention as defined in the claims.

Having thus described our invention, what we claim as new and desire to secure by Letters Patent is:

1. A self-starting synchronous motor having a field magnet structure provided with partially shaded pole projections and an alternating current exciting winding for producing a rotating magnetic field, a rotor element, said rotor element comprising a band composed of a metal of high magnetic retentivity, said band being divided by a slot which extends in part circumferentially of the band whereby the portions of the band on the opposite sides of the slot overlap each other, the circumferential extent of overlapping of the band ends being greater than the gap distance between adjacent polar projections.

2. In a self-starting synchronous motor, a rotor comprising a nonmagnetic core and a band of permanent magnet steel on said core, said band being broken by a single slot which extends in part circumferentially of the band whereby the parts of the band on opposite sides of the slot overlap.

3. In a self-starting synchronous motor, a rotor comprising a nonmagnetic core and a band of permanent magnet steel on said core, said band being broken by a slot which extends in part circumferentially of the band whereby the parts of the band on opposite sides of the slot overlap, said core having a portion thereof removed at a point diametrically opposite the slot whereby to balance the rotor.

4. A self-starting synchronous motor comprising a laminated field magnet provided with an exciting winding for producing an alternate flux therein, said magnet having alternating shaded and unshaded polar projections, a rotor between said polar projections, said rotor comprising a band of permanent magnet steel, a nonmagnetic support for said band and a shaft, said band being broken by a slot and having overlapping portions on opposite sides of said slot, said slot being curved intermediate its ends so that end portions are directed axially of the band and the central portion of the slot extends circumferentially of the band substantially parallel to the side edges of the band.

5. A rotor for a self-starting synchronous motor comprising a pair of slotted bands of high magnetic retentivity material, the slots in said bands extending in part circumferentially of the bands, said slots being diametrically opposite each other, said bands having overlapping portions terminating in blunt ends of substantial cross section.

6. A self-starting synchronous motor comprising a laminated field magnet provided with an exciting winding and cooperating partially shaded polar projections having interleaved overlapping laminations connecting the shaded and unshaded portions of adjacent pole faces, a rotor between said pole faces, said rotor comprising a band of permanent magnet steel, a shaft, a nonmagnetic core connecting the band and shaft, said band being broken by a slot and the portions of the band on the opposite sides of the slot being overlapped circumferentially of the band.

7. A rotor for a self-starting synchronous motor comprising a band of high magnetic retentivity and a nonmagnetic core upon which said band is secured, said band being broken circumferentially by a slot which has a portion between its ends extending substantially parallel to the side edges of the band whereby the band portions on opposite sides of said slot overlap each other for a substantial distance circumferentially of the band.

8. A rotor for a self-starting synchronous motor comprising a band of high magnetic retentivity material, said band being substantially cylindrical and of greater width than depth, said band being broken circumferentially by a slot, the band portions on opposite sides of said slot overlapping each other circumferentially of the band.

9. A rotor for self-starting, synchronous motors comprising a hardened steel band, said band having a single slot extending inward from one side of the band thence circumferentially of the band for a distance greater than the width of the slot and terminating at the opposite side of the band, whereby to produce a rotor having its surface substantially continuous with respect to the flux from adjacent field pole faces.

10. In a synchronous motor, a field magnet structure provided with circumferentially spaced pole projections, and an exciting winding, a rotor comprising a band composed of a metal of high magnetic retentivity and a support for said band, said band having one slot therein which crosses the band, the slot extending in part circumferentially of the band whereby the portions of the band on opposite sides of the slot overlap each other, the circumferential extent of overlapping of the said portions being greater than the gap distance between adjacent pole projections.

ALEXANDER C. REID.
HAROLD J. McCREARY.